UNITED STATES PATENT OFFICE.

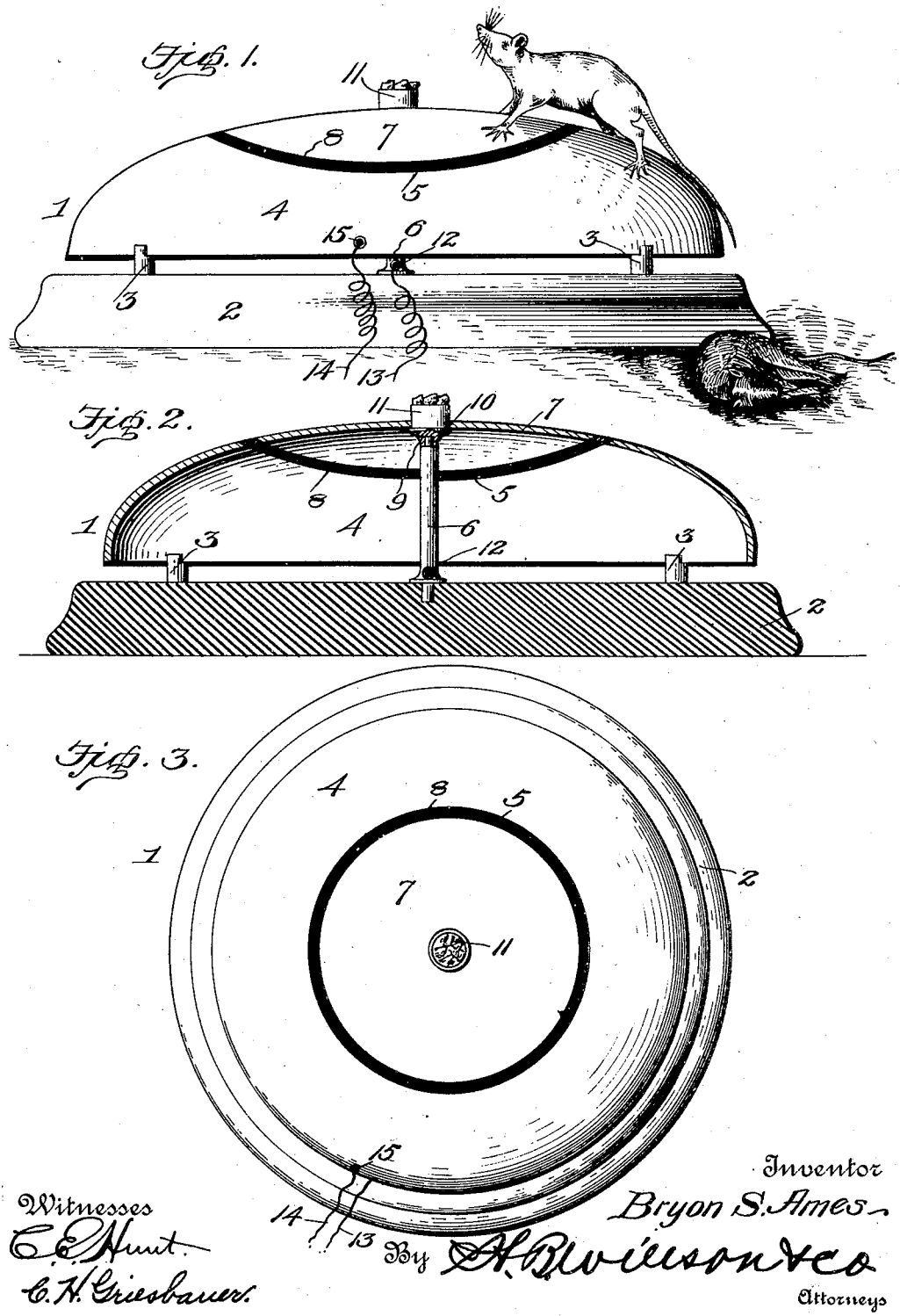

BYRON S. AMES, OF WILLIAMSPORT, PENNSYLVANIA.

ELECTRIC ANIMAL-EXTERMINATOR.

No. 922,377. Specification of Letters Patent. Patented May 18, 1909.

Application filed July 27, 1908. Serial No. 445,536.

*To all whom it may concern:*

Be it known that I, BYRON S. AMES, a citizen of the United States, residing at Williamsport, in the county of Lycoming and State of Pennsylvania, have invented certain new and useful Improvements in Electric Animal-Exterminators; and I do declare the following to be a full, clear, and exact description of the invention, such as will enable others skilled in the art to which it appertains to make and use the same.

This invention relates to improvements in electric animal exterminators.

The object of the invention is to provide an exterminator of this character, the parts of which are electrically separated and connected to the terminals of an electric circuit, whereby when an animal steps upon said parts, the circuit will be completed through its body, thus killing the animal.

With this and other objects in view, the invention consists of certain novel features of construction, combination and arrangement of parts as will be described and particularly pointed out in the appended claims.

In the accompanying drawings, Figure 1 is a side view of the exterminator, showing the operation of the same; Fig. 2 is a vertical sectional view; and Fig. 3 is a top plan view of the exterminator.

Referring more particularly to the drawings, 1 denotes the exterminator, which consists of a base portion, 2, formed of a suitable non-conducting material and having arranged thereon a series of short supporting posts, 3, which are also preferably formed of non-conducting material and are adapted to support an intermediate section, 4, which is formed of metal having good conducting qualities. The intermediate section, 4, may be of any suitable shape, but is preferably of hollow semi-ellipsoidal form, the upper surface of which is cut out to form a concavity, 5.

In the concavity, 5, and supported upon a central post or standard, 6, is an upper section, 7, the edges of which are spaced from the adjacent edges of the concavity formed in the section, 4, and is preferably electrically separated from said portion by a space in which may be inserted a strip of insulation or non-conducting material, 8. The lower end of the post, 6, is fastened in the base, 2, and has arranged on its upper end a head, 9, having a supporting flange, 10, with which the section, 7, is engaged. Above the flange, 9, is a bait cup, or receptacle, 11, which projects through and above the upper section, 7, and is adapted to contain a suitable bait or decoy.

To the post, 6, near its lower end, is secured a binding post, 12, to which is connected the end of one of the conducting wires, 13, of an electric circuit, the other wire 14 of said circuit being connected to a binding post, 15, secured to one side of the intermediate section, 4, whereby said section 4 and the outer section 7 are included in the electric circuit and form the terminals thereof.

In the operation of the device, the animal is attracted to the exterminator by the bait or decoy in the cup, 11, on the upper section, 7, and in an effort to reach the bait, climbs upon the exterminator until the forefeet touch the upper section, 7, and the hind feet engage the intermediate section, 4, at which time the electric circuit, of which said sections form the terminals, will be completed through the body of the animal, which will immediately be electrocuted, thus providing for the humane and instantaneous killing of the animals.

An exterminator constructed as herein shown and described, when set or switched into a suitable electric circuit, will always be ready for destroying any animals coming into contact therewith, and requires no attention either for resetting or for the removal of the animals destroyed, as the shape of the exterminator is such that the animals after being electrocuted, will fall off of the same.

From the foregoing description, taken in connection with the accompanying drawing, the construction and operation of the invention will be readily understood without requiring a more extended explanation.

Various changes in the form, proportion and minor details of construction may be resorted to without departing from the principle or sacrificing any of the advantages of the invention as defined in the appended claims.

Having thus described my invention, what I claim as new and desire to secure by Letters-Patent, is:

1. An electric animal exterminator comprising a body portion inclined downwardly in all directions from the center and formed in sections insulated from each other, said sections forming the terminals of an electric circuit, and means for supporting a decoy at the highest part of said body portion.

2. In an electric animal exterminator, a base, a hollow semi-ellipsoidal body portion supported thereon and forming one terminal of an electric circuit, said body portion having formed therein an opening, an outer curved portion arranged in said opening and having connected thereto the other terminal of said circuit, and an insulating strip between said body portion and said outer portion whereby said parts are electrically separated.

3. In an electric animal exterminator, a base, a series of supporting posts arranged on said base, an inner semi-ellipsoidal body portion forming a contact piece or terminal of an electric circuit and supported by said base, a central supporting post or standard arranged in said base, a flanged head on said standard, an outer contact portion arranged in the upper end of said inner portion and out of contact therewith and forming the other terminal of the electric circuit, and a bait receptacle on the flanged head of said post, and projecting above said outer contact portion.

In testimony whereof I have hereunto set my hand in presence of two subscribing witnesses.

BYRON S. AMES.

Witnesses:
W. B. WOODRUFF,
KATHRYN CUPP.